United States Patent
Koenig et al.

(10) Patent No.: US 11,802,637 B2
(45) Date of Patent: Oct. 31, 2023

(54) APPARATUS FOR FASTENING LINES

(71) Applicant: Walter Stauffenberg GmbH & Co. KG, Werdohl (DE)

(72) Inventors: Ulrich Stefan Koenig, Herscheid (DE); Matthaeus Schulz, Attendorn (DE)

(73) Assignee: WALTER STAUFFENBERG GMBH & CO. KG, Werdohl (DE)

( * ) Notice: Subject to any disclaimer, the term of this patent is extended or adjusted under 35 U.S.C. 154(b) by 0 days.

(21) Appl. No.: 17/783,827

(22) PCT Filed: Dec. 4, 2020

(86) PCT No.: PCT/EP2020/084658
§ 371 (c)(1),
(2) Date: Jun. 9, 2022

(87) PCT Pub. No.: WO2021/115959
PCT Pub. Date: Jun. 17, 2021

(65) Prior Publication Data
US 2023/0003319 A1    Jan. 5, 2023

(30) Foreign Application Priority Data

Dec. 10, 2019 (EP) .................................... 19214909

(51) Int. Cl.
*F16L 3/10* (2006.01)
*F16L 3/23* (2006.01)
*H02G 3/32* (2006.01)

(52) U.S. Cl.
CPC ............... *F16L 3/1075* (2013.01); *F16L 3/23* (2013.01); *H02G 3/32* (2013.01)

(58) Field of Classification Search
CPC ............ F16L 3/1075; F16L 3/23; H02G 3/32
See application file for complete search history.

(56) References Cited

U.S. PATENT DOCUMENTS 2,876,027 A * 3/1959 Sulmonetti ........... F16B 7/0493
403/53
4,262,869 A * 4/1981 Menshen .............. F16L 3/1091
248/634

(Continued)

FOREIGN PATENT DOCUMENTS

SE           1651019 A1    7/2016
WO    2014/037084 A1    3/2014

OTHER PUBLICATIONS

International Search Report in PCT/EP2020/084658, dated Feb. 17, 2021.

*Primary Examiner* — Anita M King
(74) *Attorney, Agent, or Firm* — Collard & Roe, P.C.

(57) ABSTRACT

An apparatus for fastening lines, in particular power cables, pipes or hoses, includes at least two interconnectible fastening parts which form a feedthrough when assembled. The fastening parts include two clamp parts which are hinged together via at least one hinge and which each receive at least one clamping block having a groove in its outer lateral surface, in which groove a portion of a clamp part is positioned, and which clamping block has, on its inner face opposite the groove, a channel, which has the shape of a cylinder-barrel portion and extends axially at a right angle to the groove, for receiving a line. A fastener is arranged at the end of a clamp part opposite the hinged connection, the fastener hook of which fastener can be brought into engagement with a mating fastener hook arranged at the end of the other clamp part opposite the hinged connection.

19 Claims, 4 Drawing Sheets

(56) References Cited

U.S. PATENT DOCUMENTS

| | | | | | |
|---|---|---|---|---|---|
| 5,305,978 | A | * | 4/1994 | Current | F16L 3/1075 248/230.4 |
| 5,984,248 | A | * | 11/1999 | Evans | F21V 21/088 248/230.4 |
| 7,770,848 | B2 | * | 8/2010 | Johnson | F16L 3/1207 248/65 |
| 7,861,982 | B1 | * | 1/2011 | McClure | E21B 17/1035 285/364 |
| 8,408,507 | B2 | * | 4/2013 | Liu | F16B 2/10 24/538 |
| 8,967,556 | B2 | * | 3/2015 | Meyers | H02G 3/32 248/68.1 |
| 9,551,438 | B2 | * | 1/2017 | Frizzell | F16L 3/23 |
| 10,663,087 | B2 | * | 5/2020 | Estepp | F16L 3/1091 |

* cited by examiner a)

b)

a)

b)

c)

APPARATUS FOR FASTENING LINES

CROSS REFERENCE TO RELATED APPLICATIONS

This application is the National Stage of PCT/EP2020/084658 filed on Dec. 4, 2020, which claims priority under 35 U.S.C. § 119 of European Application No. 19214909.4 filed on Dec. 10, 2019, the disclosure of which is incorporated by reference. The international application under PCT article 21(2) was not published in English.

BACKGROUND OF THE INVENTION

1. Field of the Invention

The invention relates to an apparatus for fastening lines, in particular power cables, pipes or hoses.

2. Description of the Related Art

For fastening lines, in particular power cables, pipes, and hoses, what are called clamps are regularly used, which comprise a clamp body that is produced from a thermoplastic or elastomer plastic or also from a metal. The clamp body is frequently formed from two fastening parts that can be connected with one another by way of screws, which parts form a feed-through for holding the line in the assembled state.

Currently, the most varied embodiments of clamps of the aforementioned type are used for laying and fastening cables and lines in the tower of a wind turbine. A disadvantage of these clamps is that they bring with them a great number of components, thereby making assembly more difficult.

SUMMARY OF THE INVENTION

This is where the invention seeks to provide a remedy. The invention is based on the task of making available an apparatus for fastening lines, in particular power cables, pipes or hoses, which has a small number of components, and which is suitable, in particular, also for efficient fixation of lines within the tower of a wind turbine. This task is accomplished by means of an apparatus having the characteristics according to the invention.

With the invention, an apparatus for fastening lines, in particular power cables, pipes or hoses, is made available, which has a lower number of components and which allows efficient installation of lines, in particular also within the tower of a wind turbine. For this purpose, the fastening parts comprise two clamp parts that are connected with one another in an articulated manner, by way of at least one hinge, which parts each hold at least one clamping block, which has a groove on its outer mantle surface, in which groove a section of a clamp part is positioned, and which block has a channel in the form of a cylinder mantle section that runs axially at a right angle to the groove, on its inner side that lies opposite the groove, for holding a line. A clamping closure is arranged on the end of a clamp part that lies opposite the articulated connection, the clamping hook of which closure can be brought into engagement with a counter-hook that is arranged on the end of the other clamp part that lies opposite the articulated connection. By way of the clamping closure, the clamping blocks can easily be braced with their groove against the line held by the latter. Because of the full-area contact of the groove on the line, damage to the line is prevented. It is made possible to easily change the positioning of the line within the apparatus by temporarily loosening the clamping closure. Preferably the clamping blocks are configured to be identical. In this way, both production and installation are simplified. In the present case, the term "clamping block" should be understood to be a solid component that is preferably configured in the manner of a prism having a trapezoid base area.

In a further development of the invention, the clamping hook is configured in the form of an eye on the end side, configured to be straight in its section that faces the counter-hook. In this way, a uniform transfer of force between clamping hook and counter-hook is made possible, wherein at the same time the clamping hook is prevented from sliding out of the counter-hook.

In an embodiment of the invention, the clamping hook is connected with the clamping bracket of the clamping closure by way of a threaded spindle. In this way, simple adjustment of the clamping hook to set the clamping force of the clamping closure is made possible. Preferably the threaded spindle is pre-stressed against the clamping bracket by way of spring elements, which particularly preferably comprise plate springs and/or helical springs. In this way, equalization of elasticity losses due to hardening of the clamping blocks, particularly if these are produced from an elastomer material, is achieved, and thereby the required holding force of the apparatus is guaranteed.

In a further embodiment of the invention, each of the two clamp parts comprises a planar end face, on which two side wings are formed, lying opposite one another and at an angle to the end face. In this way, lateral fixation of the clamping blocks in the clamp parts is achieved. Preferably the side wings are set at the same angle relative to the end face.

In a further embodiment of the invention, the inside contour of the section of the corresponding clamp part essentially corresponds to the outside contour of the groove bottom of the groove of the clamping block against which it lies. In this way, good fixation of the corresponding clamping block on the corresponding clamp part is achieved. Axially, the clamping blocks are held by way of the side walls of the groove in which they are arranged.

In a further development of the invention, at least one clamp part and at least one clamping block held by it have corresponding engagement means for a shape-fit, releasable connection with one another. In this way, easy fixation of the clamping blocks on the clamp parts is achieved.

In an embodiment of the invention, at least one clamping block has at least one engagement pin that can be introduced into an engagement bore of the clamp part that holds the pin. In this regard, a material weakening is preferably present in the clamping block, ahead of the engagement pin, which weakening is formed, for example, by means of a recess in certain regions. This material weakening allows limited backward movement of the engagement pin during introduction of the clamping block into a clamp part, until the engagement pin slides into the engagement bore.

In a further embodiment of the invention, a clamp part has at least one bore for passing a fastening screw through. In this way, easy fastening of the apparatus within the tower of a wind turbine is made possible.

In a further development of the invention, at least one holding space for holding at least one nut is arranged in a clamp part or between two clamp parts arranged adjacent to one another, the inside thread bore of which nut aligns with the bore for passing a fastening screw through. In this regard, the nut is preferably configured as a weld nut that is attached to the clamp part. In order to prevent point-type force impact on a clamping block by a screw that is screwed through the nut, the holding space for the nut must be dimensioned to be sufficiently deep.

In an embodiment of the invention, a longitudinal groove that runs at a right angle to the groove is introduced into the bottom of the groove in a clamp part, at least in certain regions, forming the holding space for the at least one nut.

In a further development of the invention, a second side wing set at an angle is formed on the first side wing, set at an angle, of the first clamp part, in each instance, wherein two clamping blocks are arranged, each lying against a first side wing between a second side wing and the end face of the clamp part. In this regard, a first side wing, in each instance, preferably encloses an angle of 120° with the second side wing formed on it. In this way, a uniform arrangement of three clamping blocks, angled relative to one another within the apparatus, is achieved, the grooves of which blocks serve for contact with one cable, in each instance. In this regard, it is not only possible for three cables to be held in the apparatus configured in this manner, in such a manner that they are braced relative to one another. It is also possible to provide a middle piece that is essentially configured in star shape, against which the three cables can be braced by way of the apparatus.

In another embodiment of the invention, each clamp part holds precisely one clamping block, wherein the side wings formed on the end face of each clamp part are set onto the end face at an angle of 90°, in each instance. In this embodiment, the two clamping blocks have an essentially cuboid-shaped form, the blocks being enclosed by the clamp parts that are configured essentially in C shape, and the grooves of the blocks serving to hold a line passed through between them, against which the clamping blocks can be braced. In this embodiment, the clamp parts and the clamping blocks are preferably configured to be identical.

In a further embodiment of the invention, the clamp parts are made of metal, preferably of sheet steel, and the clamping blocks are made of plastic, preferably elastomer. In this way, reliable bracing of the clamping blocks by the clamp parts is guaranteed. The elastic clamping blocks form a uniformly prestressed contact surface on the cables held by them.

Other further developments and embodiments of the invention are indicated in the remaining dependent claims. Exemplary embodiments of the invention are shown in the drawing and will be described in detail below. The figures show:

DETAILED DESCRIPTION OF THE PREFERRED EMBODIMENTS

Figure 1:
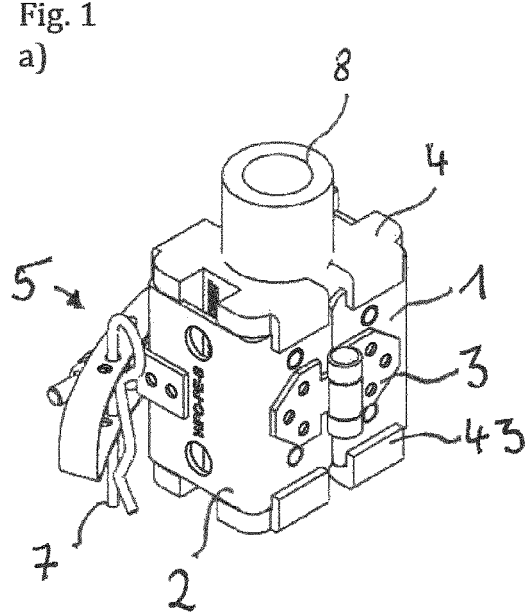
FIG. 1 the schematic representation of an apparatus for fastening a line, with the line progression indicated
 a) in a first spatial representation;
 b) in a second representation.
Figure 1:
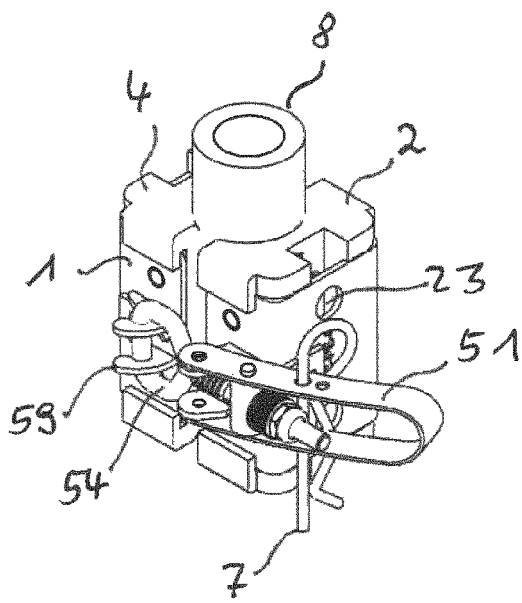
Figure 2:
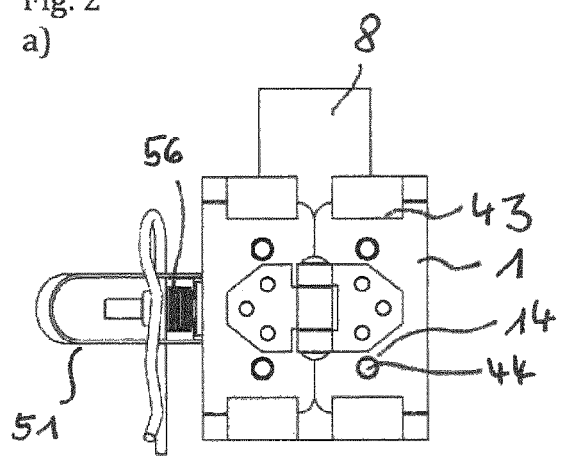
FIG. 2 the representation of the apparatus from FIG. 1
 a) in a view from the rear;
 b) in the side view;
 c) in the front view.
Figure 2:
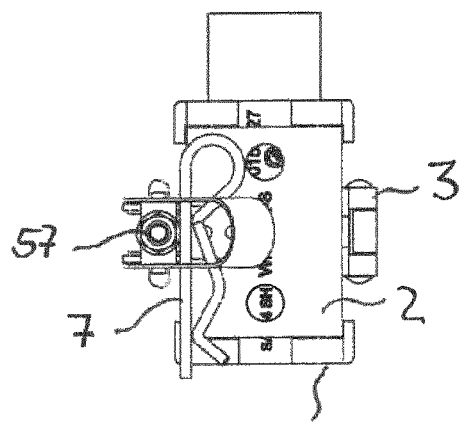
Figure 2:
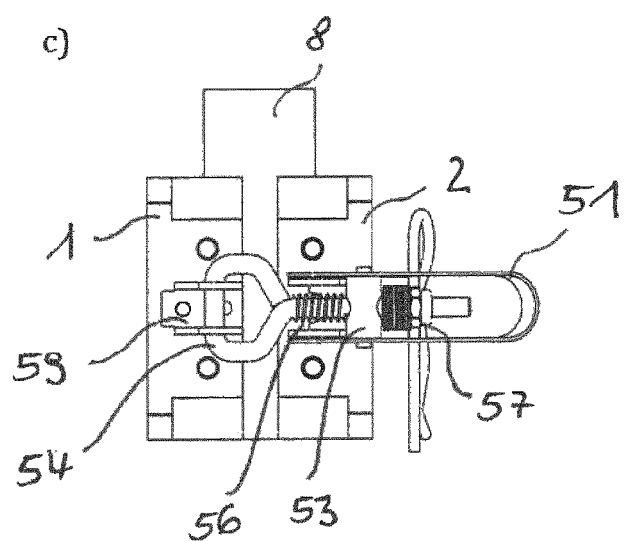
Figure 3:
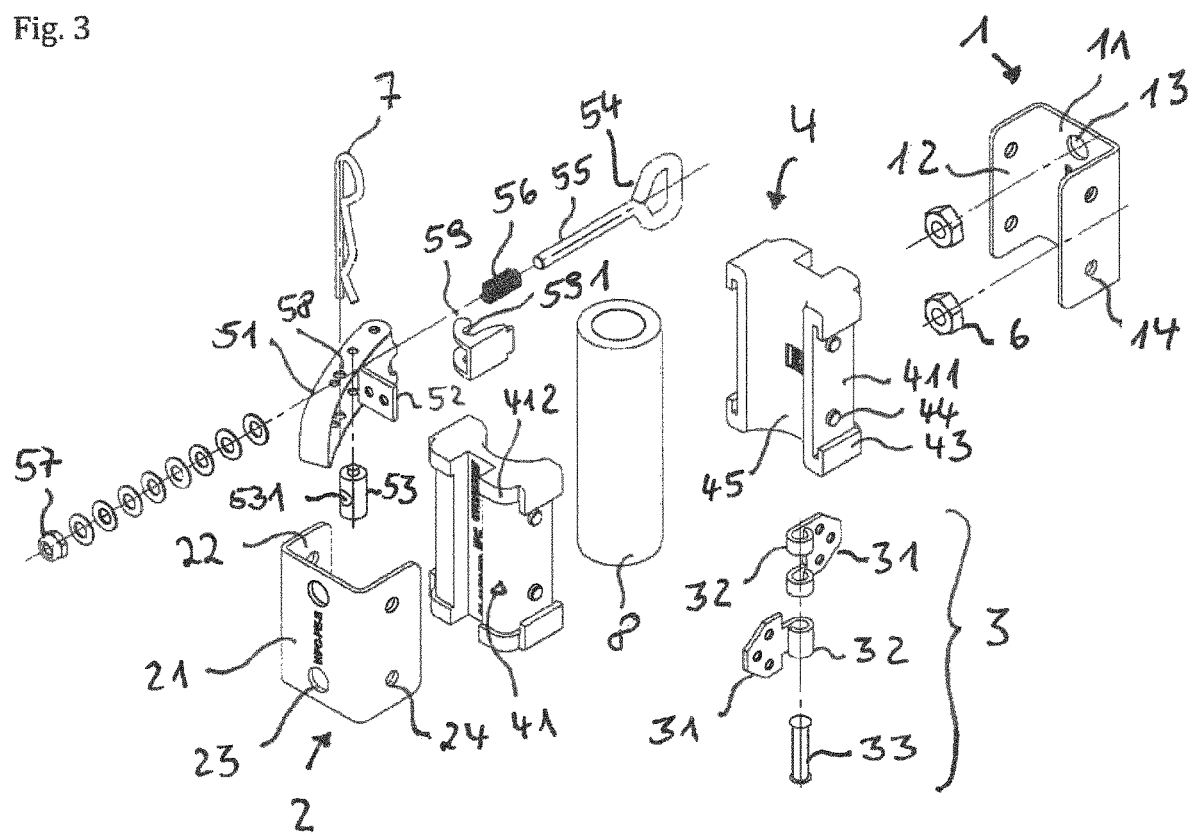
FIG. 3 the apparatus from FIG. 1 in an exploded view.

The apparatus selected as an exemplary embodiment, for fastening lines, in particular electrical lines, within the tower of a wind turbine, comprises a first clamp part 1 and a second clamp part 2, which are connected with one another in an articulated manner, by way of a hinge 3, and which each hold a clamping block 4, wherein a clamping closure 5 is provided, by way of which the two clamp parts 1, 2 can be braced relative to one another.

In the exemplary embodiment according to FIG. 1, the two clamp parts 1, 2 are structured as identical C-shaped bent sheet-metal parts, and have an end face 11, 21, on the longitudinal sides of which two side wings 12, 22 that lie opposite one another are formed. The side wings 12, 22 are set at a right angle relative to the end face 11, 21. In the center, two bores 13, 23 are introduced into the end face 11, 21, at a distance from one another. Weld nuts 6 are fastened to the end face 11, 21, aligned with the bores 13, 23, on the side facing the side wings 12, 22. The side wings 12, 22 are furthermore each provided with two engagement bores 14, 24 arranged at a distance from one another.

The hinge 3 essentially consists of two hinge fittings 31, which are each fastened to one of the two clamp parts 1, 2 and which have eyes 32 that are interlaced, on the end side, through which eyes an axle 33 is passed.

In the exemplary embodiment, the clamping block 4 is configured as an essentially cuboid-shaped injection-molded plastic part. On its rear side, facing the clamp part 1, 2, a groove 41 is introduced into the clamping block 4, which groove also extends over the side surfaces that border on the rear side, and the width of which groove approximately corresponds to the height of the clamp part 1, 2 by which the clamping block 4 is held. A longitudinal groove 42 is introduced into the groove bottom 411 of the groove 41, which longitudinal groove 42 extends over the entire length of the clamping block 4, wherein it also penetrates the side walls 412 of the groove 41. Guide ridges 43 are formed on the narrow sides of the clamping block 4, on the outside, which ridges project beyond the side walls 412 of the groove 41, so that an insertion part for the clamp part 1, 2 is formed by means of two guide ridges 43, in each instance, which lie opposite one another. Two engagement pins 43 are formed on the two narrow sides of the clamping block 4, on the groove bottom 411 of the groove 41, at a distance from one another, between the guide ridges 43, which pins correspond to the engagement bores 14, 24 of the side wings 11, 22 of the clamp parts 1, 2.

On its front side, which lies opposite the longitudinal groove 42, a channel 44 is introduced into the clamping block 4, in the longitudinal direction, the mantle surface of which channel is configured essentially in the form of a partial cylinder mantle. Preferably the inside diameter of the channel 44 approximately corresponds to the outside diameter of the line 8 to be held by the apparatus.

The clamping block 4 is inserted into the corresponding clamp part 1, 2 in such a manner that the side wings 12, 22 of the clamp part 1, 2 are guided between the groove bottom 411 and the guide ridges 43. In this regard, the engagement pins 43 engage into the engagement bores 14, 24. In this position, the weld nuts 6 that are formed on the clamp parts 1, 2 are positioned in the holding space formed by the longitudinal groove 42.

The clamping closure 5 comprises a clamping bracket 51 that is mounted so as to pivot on a boom 52 that is fastened to the second clamp part 2. The clamping bracket 51 is formed from a metal sheet bent in a U shape, between the shanks of which a shaft 53 is mounted so as to rotate. A threaded bore 531 is introduced radially into the shaft 53, into which bore the threaded spindle 55 of a clamping hook 54 is screwed. A helical spring 56 is pushed onto the clamping hook 54, which spring is pre-stressed between the clamping hook 54 and the shaft 53. On the end side, the threaded spindle 55 of the clamping hook 54 is secured by way of a locking nut 57. Plate springs 561 are arranged on the threaded spindle between the locking nut 57 and the clamping bracket 51. By means of the plate springs 561, the required clamping force of the clamping closure 5 is guaranteed even in the case of decreasing elasticity of the clamping blocks 4 that are produced from an elastomer material.

Furthermore, bores 58 for passing a locking splint 7 through are introduced into the clamping bracket 51. The clamping hook 54 that is configured in eye shape on the end side can be inserted into the undercut 591 of a counter-hook 59 that is attached to the first clamp part 1, in order to brace the first clamp part 1 against the second clamp part 2. For this purpose, the section of the eye-shaped clamping hook 54 that faces the counter-hook 59 is configured to be straight.

To fasten a line 8 in place, the latter is first laid into the channel 45 of the clamping block 4 of the first clamp part 1, and afterward the clamping block 4 of the second clamp part 2 is pivoted by way of the hinge 3, until its channel 45 also lies against the line 8. Subsequently the clamping bracket 51 is pivoted, whereby the clamping hook 45 gets behind the counter-hook 59, which is then laid into its undercut 591. Then the clamping bracket 51 is pivoted in the opposite direction, thereby bracing the first clamp part 1 against the second clamp part 2 and thereby the two clamping blocks 4 against the line held by them. In order to prevent unintentional opening of the clamping closure 5, it is secured by way of a locking splint 7 that is inserted through the bores 58 of the clamping bracket 51.

Figure 4:
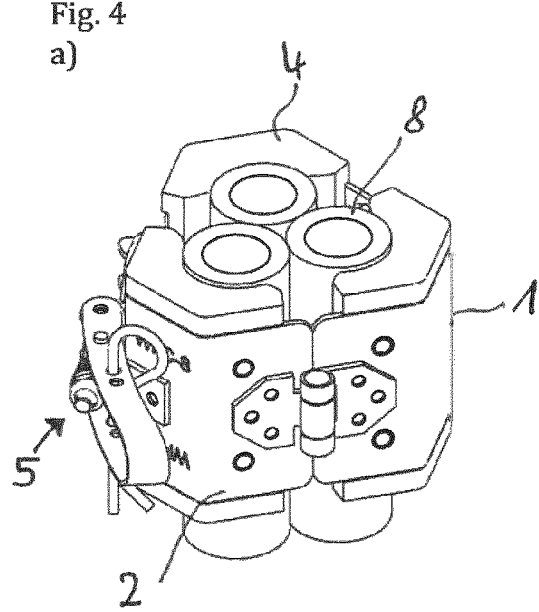
FIG. 4 the schematic representation of an apparatus in a further embodiment, for fastening three lines, with the line progression indicated
 a) in a first spatial representation;
 b) in a second spatial representation.
Figure 4:
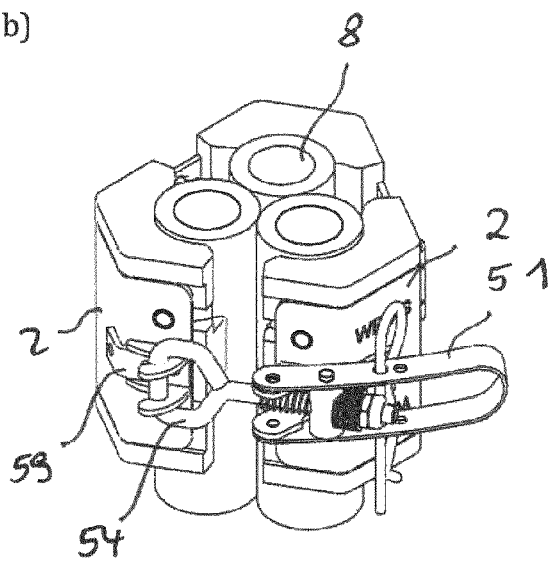
Figure 5:
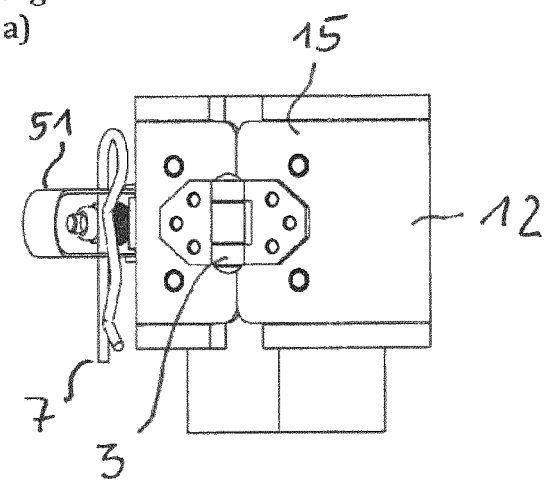
FIG. 5 the representation of the apparatus from FIG. 4
 a) in a view from the rear;
 b) in the side view;
 c) in the view from the front, and
FIG. 6 the apparatus from FIG. 4 in an exploded view.
Figure 5:
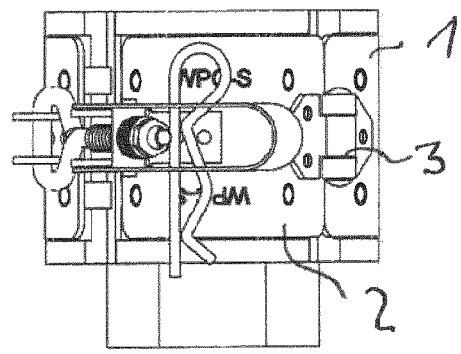
Figure 5:
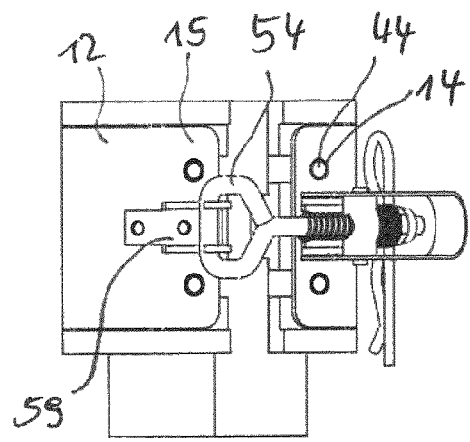
Figure 6:
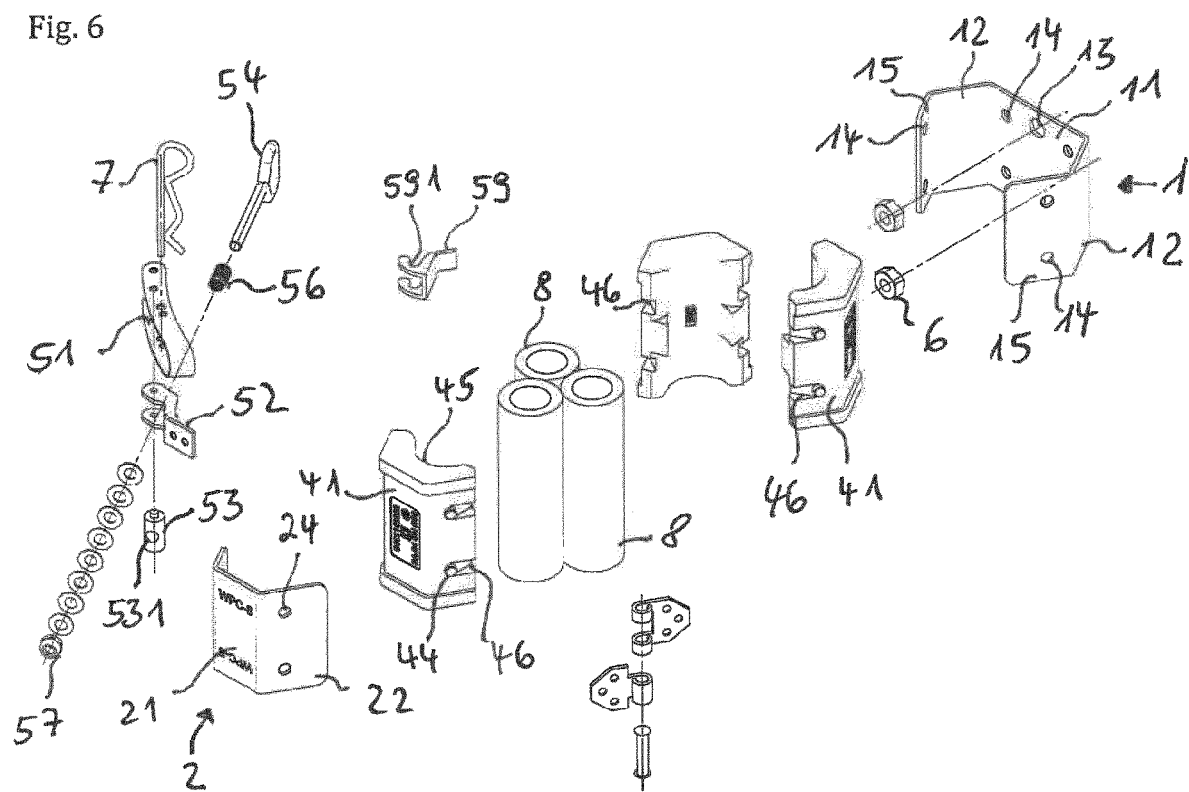

In the exemplary embodiment according to FIG. 4, the apparatus is configured for holding three lines. Here, the first clamp part 1 once again has an end face 11, on the longitudinal sides of which two side wings 12 are formed. Here, the side wings 12 are set on the end face 11 at an angle of 120°. A second side wing 15 is formed on the side wings 12, in each instance, which in turn is set at an angle of 120° relative to the adjacent first side wing 12, in each instance. A first side wing 12 thereby forms a holder for a clamping block 4, in each instance, together with the second side wing 15 formed on it, and the end face 11. For this purpose, the second side wings 15 are each provided with engagement bores 14 arranged at a distance from one another. Lying opposite the engagement bores 14, two further engagement bores 14 are introduced into the end face 11, in each instance, which therefore has four engagement bores 14. In the center, once again at a distance from one another, two bores 13 are introduced into the end face 11. Two weld nuts 6 are fastened to the end face 11, on its side facing the side wings 12, aligning with the bores 13.

The second clamp part 2 is also structured as a sheet-metal part and has an end face 21, on the two longitudinal sides of which two side wings 22 are formed, which each are set on the end face 21 at an angle of 120°. Two engagement bores 24 are introduced into the side wings 22, at a distance from one another, in each instance.

The clamping blocks 4 are configured in the manner of a prism having trapezoid base surfaces. A channel 45 is introduced in the front side, which faces the cable 8, which channel is essentially configured in the manner of a half-cylinder mantle. The rear side, which lies opposite the channel 45, encloses an angle of 120°, in each instances, with the side walls that border on it. Once again, a groove 41 for holding a clamp part 1, 2 is introduced into the rear side and the side walls that border on it. In the region of the side walls of the clamping block 4, two engagement pins 44 are formed on the groove bottom 411 of the groove 41, at a distance from one another, in each instance. Ahead of the engagement pins 44, a prism-shaped recess 46 is introduced into the clamping block 4, in each instance. By means of the recesses 46, elastic pivoting of the engagement pins 44 is made possible to a limited extent.

Two clamping blocks 4 are inserted into the first clamp part 1, wherein one clamping block, in each instance, is pushed in between the end face 11 and a second side wing 15, until the engagement pins 44 have engaged into the engagement bores 14. A side wing 12 thereby lies against the groove bottom 411 of the groove 41 of the clamping block 4 between the side walls 412. The weld nuts 6 are positioned in a holding space formed between the two clamping blocks 4. For this purpose, recesses that complement one another are introduced into the clamping blocks. A further clamping block 4 is held by the second clamp part 2, which in turn lies against the groove bottom 412 of the clamping block 4. In this regard, the engagement pins 44 engage into the engagement bores 24 of the second clamp part 2. The first clamp part is once again connected with the second clamp part 2 so as to pivot, by way of a hinge 3, and can be braced in place by way of a clamping closure 5, in the manner described above.

The invention claimed is:

1. An apparatus for fastening lines (8), comprising at least two fastening parts that can be connected with one another, which form a feed-through in the assembled state,
    wherein the fastening parts comprise two clamp parts (1, 2) that are connected with one another in an articulated manner, by way of at least one hinge (3), which parts each hold at least one clamping block (4), which has a groove (41) on its outer mantle surface, in which groove a section of a clamp part (1, 2) is positioned, and which block has a channel (43) in the form of a cylinder mantle section that runs axially at a right angle to the groove (41), on its inner side that lies opposite the groove (41), for holding a line,
    wherein a clamping closure (5) comprising a clamping hook (54) is arranged on the end of a clamp part (2) that lies opposite the articulated connection,
    wherein the clamping hook (54) can be brought into engagement with a counter-hook that is arranged on the end of the other clamp part (1) that lies opposite the articulated connection,
    wherein the clamping blocks are configured in the manner of a prism having a trapezoid base surface.

2. The apparatus according to claim 1, wherein a clamp part (1, 2) has at least one bore (13, 23) for passing a fastening screw through.

3. An apparatus for fastening lines (8), comprising at least two fastening parts that can be connected with one another, which form a feed-through in the assembled state,
    wherein the fastening parts comprise two clamp parts (1, 2) that are connected with one another in an articulated manner, by way of at least one hinge (3), which parts each hold at least one clamping block (4), which has a groove (41) on its outer mantle surface, in which groove a section of a clamp part (1, 2) is positioned, and which block has a channel (43) in the form of a cylinder mantle section that runs axially at a right angle to the groove (41), on its inner side that lies opposite the groove (41), for holding a line, wherein a clamping closure (5) comprising a clamping hook (54) is arranged on the end of a clamp part (2) that lies opposite the articulated connection, wherein the clamping hook (54) can be brought into engagement with a counter-hook that is arranged on the end of the other clamp part (1) that lies opposite the articulated connection, wherein the clamping hook (54) is configured in the form of an eye on the end side, configured to be straight in its section that faces the counter-hook (59), and/or wherein the clamping hook (54) is connected with a clamping bracket (51) of the clamping closure (5) by way of a threaded spindle (55).

4. The apparatus according to claim 3, wherein the threaded spindle (55) is pre-stressed against the clamping bracket (51) by way of spring elements.

5. An apparatus for fastening lines (8), comprising at least two fastening parts that can be connected with one another, which form a feed-through in the assembled state, wherein the fastening parts comprise two clamp parts (1, 2) that are connected with one another in an articulated manner, by way of at least one hinge (3), which parts each hold at least one clamping block (4), which has a groove (41) on its outer mantle surface, in which groove a section of a clamp part (1, 2) is positioned, and which block has a channel (43) in the form of a cylinder mantle section that runs axially at a right angle to the groove (41), on its inner side that lies opposite the groove (41), for holding a line, wherein a clamping closure (5) comprising a clamping hook (54) is arranged on the end of a clamp part (2) that lies opposite the articulated connection, wherein the clamping hook (54) can be brought into engagement with a counter-hook that is arranged on the end of the other clamp part (1) that lies opposite the articulated connection, wherein each of the two clamp parts (1, 2) comprises a planar end face (11, 21), on which two side wings (12, 22) are formed, lying opposite one another and at an angle to the end face.

6. The apparatus according to claim 5, wherein the inside contour of the section of the corresponding clamp part (1, 2) essentially corresponds to the outside contour of the groove bottom (411) of the groove (41) of the clamping block (4) against which it lies.

7. The apparatus according to claim 5, wherein at least one clamp part (1, 2) and at least one clamping block (4) held by it have corresponding engagement means for a shape-fit, releasable connection with one another.

8. The apparatus according to claim 5, wherein a second side wing (15) set at an angle is formed on the first side wing (12), set at an angle, of the first clamp part (1), in each instance, wherein two clamping blocks (4) are arranged, each lying against the first side wing (12) between a second side wing (15) and the end face (11) of the clamp part (1).

9. The apparatus according to claim 5, wherein a first side wing (12), in each instance, encloses an angle of 120 degrees with the second side wing (15) formed on it.

10. The apparatus according to claim 5, wherein each clamp part (1, 2) holds precisely one clamping block (4), wherein the side wings (12, 22) formed on the end face (11, 21) of each clamp part (1, 2) are set onto the end face (11) at an angle of 90 degrees, in each instance.

11. The apparatus according to claim 5, wherein a clamp part (1, 2) has at least one bore (13, 23) for passing a fastening screw through.

12. An apparatus for fastening lines (8), comprising at least two fastening parts that can be connected with one another, which form a feed-through in the assembled state, wherein the fastening parts comprise two clamp parts (1, 2) that are connected with one another in an articulated manner, by way of at least one hinge (3), which parts each hold at least one clamping block (4), which has a groove (41) on its outer mantle surface, in which groove a section of a clamp part (1, 2) is positioned, and which block has a channel (43) in the form of a cylinder mantle section that runs axially at a right angle to the groove (41), on its inner side that lies opposite the groove (41), for holding a line, wherein a clamping closure (5) comprising a clamping hook (54) is arranged on the end of a clamp part (2) that lies opposite the articulated connection, wherein the clamping hook (54) can be brought into engagement with a counter-hook that is arranged on the end of the other clamp part (1) that lies opposite the articulated connection, wherein at least one clamp part (1, 2) and at least one clamping block (4) held by it have corresponding engagement means for a shape-fit, releasable connection with one another, wherein at least one clamping block (4) has at least one engagement pin (44) that can be introduced into an engagement bore (14, 24) of the clamp part (1, 2) that holds the pin.

13. The apparatus according to claim 12, wherein a clamp part (1, 2) has at least one bore (13, 23) for passing a fastening screw through.

14. An apparatus for fastening lines (8), comprising at least two fastening parts that can be connected with one another, which form a feed-through in the assembled state, wherein the fastening parts comprise two clamp parts (1, 2) that are connected with one another in an articulated manner, by way of at least one hinge (3), which parts each hold at least one clamping block (4), which has a groove (41) on its outer mantle surface, in which groove a section of a clamp part (1, 2) is positioned, and which block has a channel (43) in the form of a cylinder mantle section that runs axially at a right angle to the groove (41), on its inner side that lies opposite the groove (41), for holding a line, wherein a clamping closure (5) comprising a clamping hook (54) is arranged on the end of a clamp part (2) that lies opposite the articulated connection, wherein the clamping hook (54) can be brought into engagement with a counter-hook that is arranged on the end of the other clamp part (1) that lies opposite the articulated connection, wherein a clamp part (1, 2) has at least one bore (13, 23) for passing a fastening screw through, wherein at least one holding space for holding at least one nut is arranged in a clamping block (4) or between two clamping blocks (4) arranged adjacent to one another, the inside thread bore of which nut aligns with the bore (13, 23) for passing a fastening screw through.

15. The apparatus according to claim 14, wherein a longitudinal groove (42) that runs at a right angle to the groove is introduced into the groove bottom (411) in a clamping block (4), at least in certain regions, for holding at least one nut.

16. The apparatus according to claim 14, wherein a weld nut (6) is fastened to the clamp part (1, 2), the inside thread of which nut aligns with the bore (13, 23).

17. The apparatus according to claim 14, wherein a second side wing (15) set at an angle is formed on the first side wing (12), set at an angle, of the first clamp part (1), in each instance, wherein two clamping blocks (4) are arranged, each lying against the first side wing (12) between a second side wing (15) and the end face (11) of the clamp part (1).

18. The apparatus according to claim 14, wherein a first side wing (12), in each instance, encloses an angle of 120 degrees with the second side wing (15) formed on it.

19. The apparatus according to claim 14, wherein each clamp part (1, 2) holds precisely one clamping block (4), wherein the side wings (12, 22) formed on the end face (11, 21) of each clamp part (1, 2) are set onto the end face (11) at an angle of 90 degrees, in each instance.

\* \* \* \* \*